July 18, 1933.  W. W. NUGENT  1,919,034
PRESSURE FILTER
Filed April 7, 1931  2 Sheets-Sheet 1
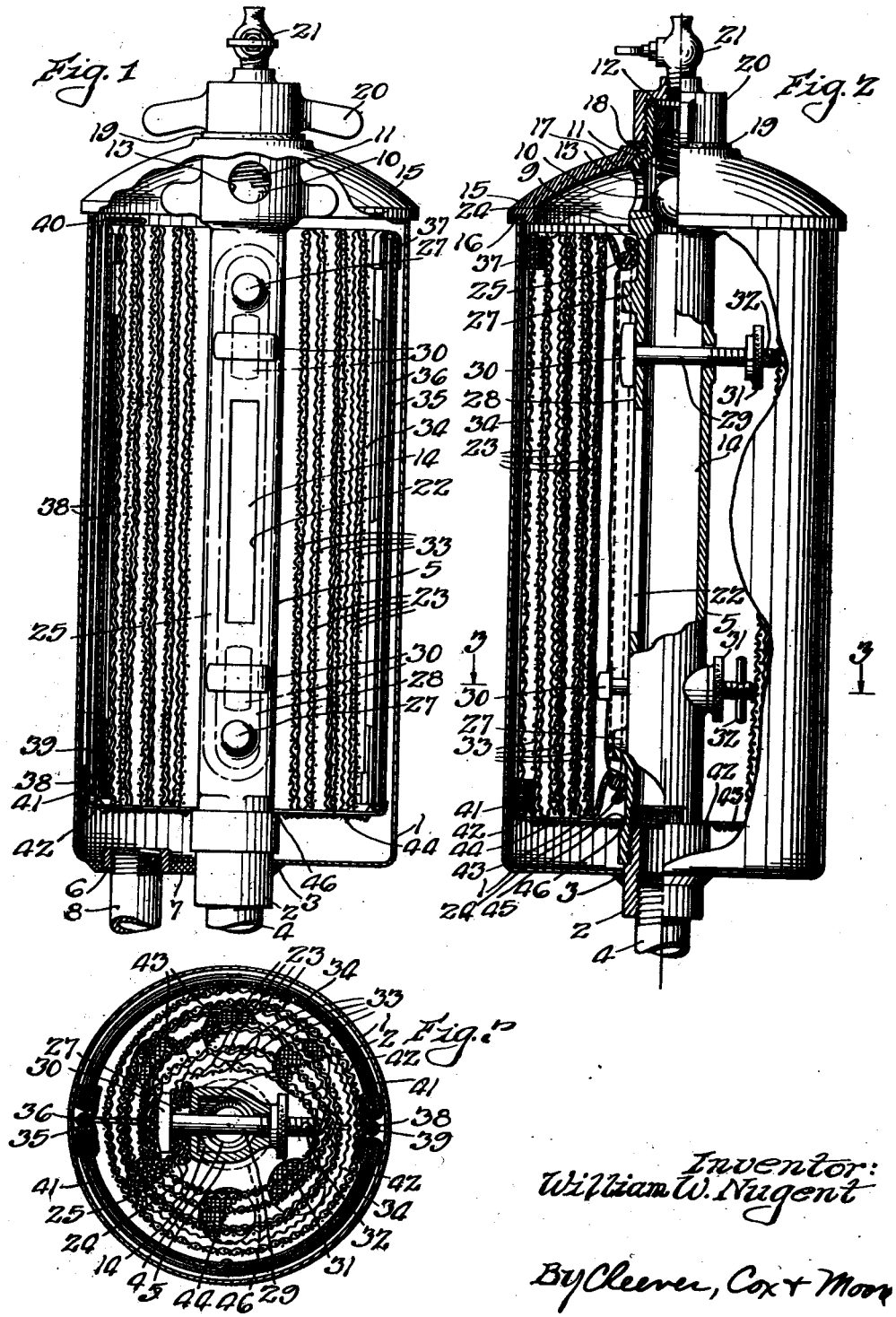
Inventor:
William W. Nugent
By Cleever, Cox + Moor
Attys.

July 18, 1933.   W. W. NUGENT   1,919,034
PRESSURE FILTER
Filed April 7, 1931   2 Sheets-Sheet 2
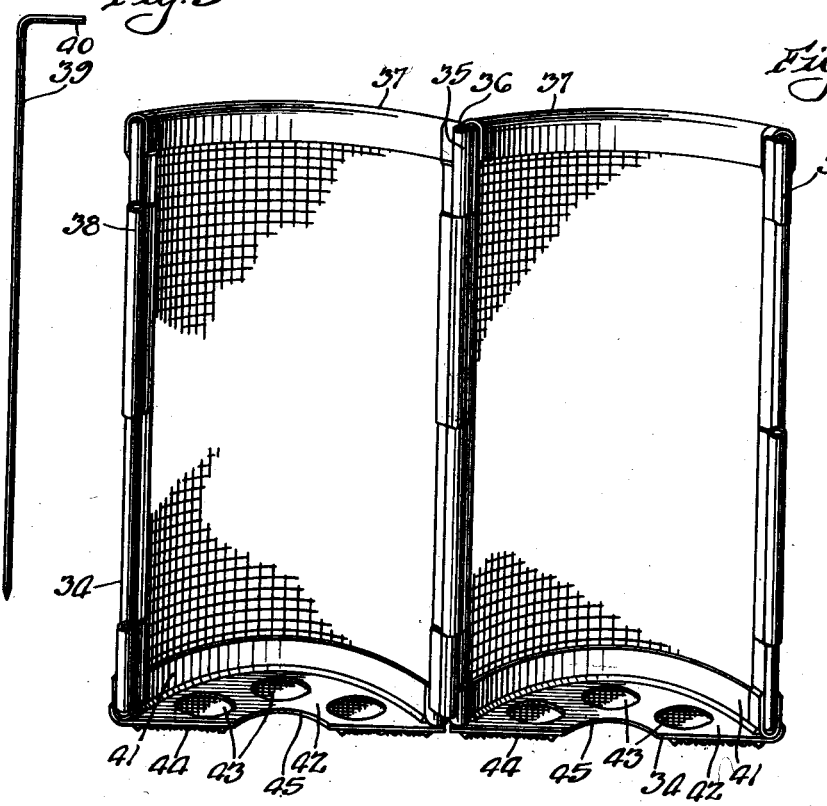
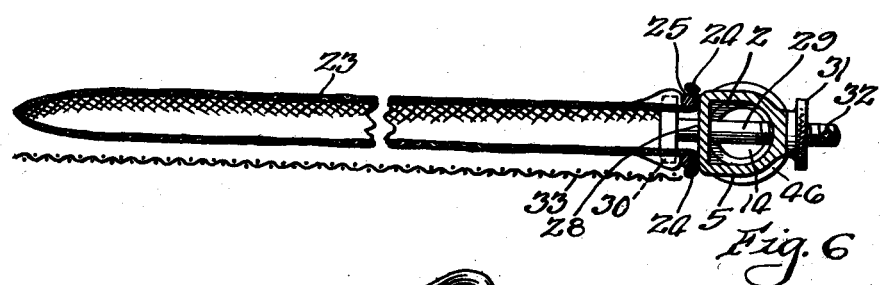
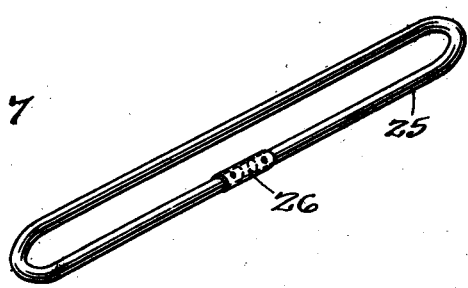
Inventor:
William W. Nugent
By Cheever, Cox + Moore
Att'ys.

UNITED STATES PATENT OFFICE

WILLIAM W. NUGENT, OF CHICAGO, ILLINOIS

PRESSURE FILTER

Application filed April 7, 1931. Serial No. 528,292.

The present invention relates to filtering apparatus and especially to that class of apparatus in which the liquid to be filtered is filtered under pressure. In pressure filters it is quite necessary that the parts be assembled in liquid-tight engagement so that the liquid will not pass through the device in other than the intended manner.

One object of this invention therefore, is to provide mechanism for securing the parts of the filter in liquid-tight engagement with each other while at the same time rendering the parts thereof quickly detachable for cleaning or like purposes.

In the present invention the liquid is fed through a hollow tubular member and a filter bag is releasably secured thereto and communicates with an opening in said tubular member so that the liquid will pass into said filter bag without loss of the filtering liquid through the joint between the filter bag and the tubular member.

Other objects of this invention reside in the novel manner of assembling the various parts of the central filter unit so that they may be quickly inserted in a casing which is to contain the same, the casing acting as a receptacle for the filtered liquid. A conduit is connected with said casing so as to carry the filtered liquid away from the filtering unit.

Other objects of this invention will appear hereinafter as the description thereof proceeds, the novel features, arrangements and combinations being clearly set forth in the appended claims.

In the drawings:

Fig. 1 is a vertical cross section through a filter unit embodying my invention.

Fig. 2 shows a portion of the device in vertical cross section and with additional portions broken away for the sake of clearness.

Fig. 3 is a section taken substantially along the line 3—3 of Fig. 2.

Fig. 4 is a view illustrating the construction of the cage which embraces the filter bag and holds the same in proper relation to the central conduit.

Fig. 5 shows the locking pin for holding the cage in closed position about the filter bag.

Fig. 6 is a horizontal cross-section through the central tubular member shown in Fig. 2 with the filter bag extended in a straight line instead of wound about the central tubular member, and Fig. 7 illustrates the construction of a part of the bag holding means shown in Figs. 1, 2 and 6.

In the drawings the reference numeral 1 indicates a casing acting as a receptacle for the reception of the filtered liquid. As best seen in Fig. 2 the bottom central portion of the casing is provided with a central opening in which there is fitted a member 2 which is brazed or otherwise secured at 3 to the casing to form a liquid-tight engagement therewith. The member 2 is threaded internally at the bottom for the reception of the inlet conduit 4 and externally at the upper end thereof for releasably securing the central tubular member 5 of the filter unit. The bottom of the casing is also provided with a member 6 which is also secured to the casing by brazing or soldering as at 7 and this member 6 is threaded internally to receive the threaded end of a conduit 8 which is the outlet conduit for carrying the filtered liquid out of the casing 1.

The central conduit 5 is hollow throughout substantially its entire length and has a ball seat 9 thereon near its upper end. A ball valve normally rests on the seat 9 and is spring-pressed thereagainst by the spring 11 which abuts against the threaded block 12 which is threaded in the upper end of the tubular member 5. Openings 13 communicate with the central opening 14 of the tubular member 5 when the ball valve 10 is lifted and provides a means whereby when excess pressure is exerted within the tubular member 5, the liquid will be by-passed into the casing 1 without passing through the filter bag to be described later, as it is obvious that it is better that the lubricant be by-passed even though not filtered than to stop the flow of lubricant through the lubricating system in which this filter system is adapted to be arranged. In other words, if the filter bag should become clogged with foreign material to such an extent that the liquid to be filtered will not pass therethrough, the circulation of the liquid would be stopped unless a pressure relief valve such as 10 be interposed in the system. Since this device is to be used particularly with lubricating systems it is obvious that the flow of lubricant should be continued regardless of whether it is filtered or not for it is necessary that the lubricant be used even though it be slightly contaminated, as slightly contaminated oil will not cause as much injury as will no oil at all.

The tubular member 5, as already stated, is screw threaded on the outside of the member 2 so as to be releasable therefrom. The cover 15, having a sealing gasket 16 thereon engaging the upper edge of the container 1 and having a seat 17 engaging a shoulder 18 on the upper end of the tubular member 5, is adapted to seal the container and prevent lateral movement of the member 5. An additional seal 19 interposed between the top of the cover and the wing nut 20 acts as a seal to prevent the passage of liquid through the opening in the central portion of the cover. The wing nut 20 has a central threaded opening in which is screw threaded the valve 21 adapted to relieve the pressure in the filter unit or for taking samples of the liquid which is in the filter casing or for releasing entrapped air. It is obvious from an inspection of Fig. 2 that the valve 21 communicates with the casing 1 through the opening 13 in the tubular member 5.

The structure so far described illustrates clearly the manner in which the casing itself is made liquid-tight. I will now proceed to describe the manner in which the filter bag is secured to the central tubular member 5 so that the mouth of the bag will communicate with the opening 14 in the tubular member through the lateral opening 22 in the side of the tubular member.

As is best seen in Figs. 1, 2, 3 and 6, the filter bag 23 is provided with a bead portion 24 about its mouth. An elongated loop member 25, see particularly Fig. 7, having its ends secured together by a connector 26, or formed as a continuous ring in which the opposite ends may be welded or otherwise fastened together, is adapted to surround the mouth of the bag and be arranged with the opening thereof substantially symmetrically arranged with respect to the opening 22 and surrounding the projections 27 integral with the tubular member 5 at opposite ends thereof. As is best illustrated in Fig. 3 the projections 27 protrude from a flat face 28 on the tubular member 5 which forms a seat against which the adjacent inner surface of the filter bag 23 may be pressed by means of the ring 25.

Means are provided for holding the ring 25 in the position illustrated in the drawings. This means comprises a plurality of quickly releasable clamps which are held in operative position at all times so as to be ready for use. Means is also provided whereby the clamping means cannot be accidentally misplaced.

A plurality of bolts, each of which has a stem portion 29 and an elongated member 30 have the stems thereof passing through the tubular member transversely to its longitudinal axis and with the under side of the head 30 opposed to the flat surface 28. A thumb nut 31 is threaded on the end of the stem 29 remote from the head 30 and is adapted to draw the head 30 toward the face 28 by its operative engagement with the tubular member 5.

The end of the bolt 29 is provided with a transversely arranged pin 32 which prevents the nut 31 from becoming free of the stem 29 and also acts as a means whereby the position of the head 30 may be located, that is the pin 32 is in fixed relation to the longitudinal dimension of the head 30 and therefore the position of the pin 32 indicates the position of the longitudinal axis of the head 30.

The member 25 is arranged about the outer surface of the mouth of the filter bag with the bead portion 24 arranged substantially as shown in Fig. 6. The member 25 is then arranged so as to bring the inner surface of the mouth of the bag into engagement with the surface 28, the heads 30 being in the position of the head 30 of the bolt shown at the top in Fig. 2 when this is being done, otherwise the heads would be in the way of the arrangement of the member 25. After the member 25 has passed the heads 30 or after the mouth of the bag is against the seat 28, the pin 32 is rotated through substantially 90 degrees to bring the head 30 into the position illustrated in Fig. 6. The nut 31 is then rotated to clamp the mouth of the filter bag tightly against the face 28.

With this arrangement it is quite evident that the filter bag is in liquid-tight communication with the central opening 14 of the tubular member 5 and that the liquid to be filtered must pass into the bag 23 unless the pressure is so great that it operates relief valve 10.

It will be understood of course that the fastening of the bag is accomplished while the member 5 is out of the casing 1. After the bag has been secured to the tubular member 5 the same is wound spirally about the member 5 as illustrated in Fig. 3, it being noted that the pins 32 in Fig. 3 are arranged so that they will not cut into the filter bag to thereby cause a leak in the same. A flexible reticulated spacing element 33 is first arranged in substantially parallel relation with the filter bag 23 shown in Fig. 6 and is wound about the tubular member 5 therewith so as to keep the adjacent filtering surfaces of the filter bag spaced from each other after the filter bag has been wound about the tubular member 5. The type of reticulated member which I prefer to use is more fully described in my co-pending application Serial No. 441,220, filed April 3, 1930.

After the filter bag has been wound about the tubular member 5 it is enclosed within a cage best illustrated perhaps in Figs. 3 and 4. In these figures the reference numerals 34 refer to reticulated elements to which are secured metal hinge elements 35 through which a pin 36 is adapted to pass. This forms a piano type hinge between the two halves of the cage. The upper ends of the reticulated elements 34 are re-inforced by the metal strips 37. The members 38, similar to the hinge members 35, are provided in staggered relation at the opposite free ends of the cage and are secured to the reticulated members 34 to form reinforcing means for those members along the adjacent edges and when the two halves of the cage are pivoted about the pin 36 to bring the axes of the openings in the members 38 in alignment with each other, the locking pin 39 is inserted through the openings in the members 38 to hold them in position to form a cylindrical cage which is adapted to house the filter bag which is rolled about the tubular member 5. The locking pin 39 is provided with an operating handle 40.

The bottom edges of the reticulated members 34 are reinforced by the metal strips 41 and semi-circular plates 42 are secured to the metal strips 41 by soldering or like means and are provided with a plurality of openings 43 covered by a reticulated element 44. The plates 42 are also provided with semi-circular openings 45 which together form a circular opening for the reception of the tubular member 5 when the cage is in operative position above the filter bag. The cage is assembled about the filter bag after the latter has been wound into spiral form and the plates 42 are adapted to rest on the shoulder 46 of the member 5 as best illustrated in Fig. 2 to hold the bottom of the cage spaced from the bottom of the container 1 when the cage and filter bag are arranged within the container.

After the cage has been arranged in operative position about the filter bag and the tubular member 5 threaded on the member 2, the cover 15 and wing nut 20 are placed in operative positions to accomplish their intended purposes.

This arrangement of the filter bag within the casing 1 is such that during the normal operation of the device the liquid enters the tubular member 5 through the inlet 4 and passes through the opening 22 into the interior of the filter bag. The pressure causes the liquid to be forced through the filter bag into the space formed by the reticulated members 33. The filtered liquid then drops to the bottom of the casing and is carried out of the casing through the outlet 8. In the event that the pressure in the conduit 14 becomes too great for any reason whatsoever, the most common reason being that the filter bag and the pores thereof become filled with foreign matter, the relief valve 10 will open and permit the liquid to pass through the openings 13 into the casing so as to insure that at all times some of the filtered liquid will pass through the outlet 8, for in the use of lubricating oils this is particularly important. As stated before, slightly contaminated oil is better than no oil at all.

Obviously other changes could be made in my invention by those skilled in the art to which this invention pertains, and therefore I do not wish to be limited except as set forth in the appended claims.

Having thus fully described my invention, what I claim as new and desire to obtain by Letters Patent is:

1. In a filter, the combination with a hollow conduit, of an opening in one portion of said conduit communicating with the interior and exterior thereof, a filter bag having the mouth arranged in communication with said opening, said conduit having a clamping surface thereon adjacent said mouth and extending outwardly away from said mouth on all sides thereof and releasable clamping means for holding the edges of said mouth of said bag in firm engagement with said clamping surface comprising a rigid loop member surrounding said mouth, and means for moving said member in a direction toward said clamping surface and for holding a layer of the material of said bag between said loop member and said conduit to prevent the escape of liquid therefrom.

2. In a filter, the combination with an open-mouthed filter element, of a rigid member for encircling said mouth, a conduit having an opening communicating with said mouth, said conduit having a clamping surface thereon surrounding said mouth and extending outwardly from the sides thereof and means for clamping said rigid member against said clamping surface to hold said filter element in rigid engagement with said conduit.

3. In a filter, the combination with an open-mouthed filter unit, of a rigid removable loop member for encircling said mouth, a conduit having an opening communicating with said mouth, and means for clamping said rigid loop member against said conduit to hold said filter unit in rigid engagement with said conduit comprising clamping members each having elongated portions arranged to engage and urge a plurality of separated portions of said rigid loop member in a direction toward said conduit, a section of said filter unit lying between said rigid loop member and said conduit so as to be held in liquid-tight engagement therewith.

4. In a filter, the combination with a filter bag having an open mouth, of a rigid looped member arranged about the periphery of said mouth, a conduit for conveying the liquid to be filtered, an opening in said conduit communicating with said open mouth of said filter bag, a portion of the material of said filter bag adjacent said mouth lying between said conduit and said looped member, a bolt movable with respect to said conduit having a head thereon adapted to engage the interior of said filter bag and to press said looped member against said conduit to hold the mouth of said filter bag in firm engagement with said conduit.

5. In a filter, the combination with an open-mouthed filter bag, of an elongated rigid looped member embracing the periphery of said mouth, a conduit having an opening communicating with said mouth, the peripheral edge of said mouth lying between said rigid looped member and said conduit, bolts having the shanks thereof extending through said conduit transversely thereof and having elongated heads thereon arranged to enter said mouth between the opposed sides thereof, and the opposed portions of said rigid member, each of said heads being sufficiently long in their longest dimension to straddle opposite portions of said rigid looped member when said head is in one position and being small enough in their smallest transverse dimension to pass between opposed portions of said rigid member when the same are arranged in another position, and clamping means for drawing said heads toward said rigid member for moving said rigid member toward said conduit when the head of said bolts are arranged straddling opposed portions of said rigid member.

6. A device as claimed in claim 5 in which the stems of said bolts are provided with indicating means thereon for indicating the positions of said heads relative to said rigid member.

7. Releasable clamping means for filters comprising a conduit having a flat side and an opening in said flat side communicating with the interior of said conduit, a rigid looped member, a filter bag having an open mouth with the edge of said mouth between said flat surface on said conduit and said rigid looped member, bolts extending through said conduit transversely thereof, elongated heads on said bolts having flat surfaces opposed to said flat surface on said conduit and substantially parallel therewith, means for drawing said heads toward said flat surface on said conduit, said heads being elongated to permit insertion of said heads into said filter bag when said heads are turned to one position about their axes, and for the purpose of enabling the head of each bolt to straddle opposite portions of said looped member and force said looped member towards said flat surface on said conduit when said bolts are actuated.

8. In a filter, the combination with a casing having a cover therefor, a central conduit releasably secured to an inlet opening in said casing, a filter bag having the edges thereof opposed to the outer surface of said conduit, said conduit having an opening communicating with the mouth of said bag, clamping members arranged in a position straddling opposite portions of said mouth and a rigid member arranged between said last mentioned members and said conduit and engaging the peripheral portion of said mouth, and means for drawing said clamping members in a direction such that the rigid member will clamp the peripheral edge of said mouth against the adjacent surface of said conduit.

9. In a filter element, the combination with a conduit having a flat side and an opening communicating with said flat side and with the interior of said conduit, a continuous looped member, a filter element having an open mouth arranged over said opening and with the peripheral edge of said mouth arranged between said looped member and the flat side of said conduit, and holding means for pressing said looped member against said flat side of said conduit.

10. In a filter element, the combination with a conduit having a flat side, and an opening communicating with said flat side and with the interior of said conduit, a continuous looped member, a filter element having an open mouth arranged over said opening and with the peripheral edge of said mouth arranged between said looped member and the flat side of said conduit, and holding means for pressing said looped member against said flat side of said conduit, comprising bolts extending through said conduit and through said looped member, heads on said bolts having two different transverse dimensions, one of which permits the passage of said heads between the sides of said looped members, and the other dimensions being sufficient to permit the head to straddle the opposed portions of said looped member when said bolt is turned, and means for drawing the heads of said bolts toward said looped members to thereby hold the open mouth of said bag in firm engagement with said flat surface.

11. A device as claimed in claim 10 in which said flat surface has projecting lugs for preventing longitudinal shifting movement of said looped member and for locating said looped member in proper position with relation to said opening so that said open mouth of said filter bag will be in proper communication with said opening.

12. In a filter, the combination with a filter element arranged in compact relation and a cage for holding said filter element in compact relation and for supporting the same comprising a pair of reticulated semi-cylindrical members pivoted to each other in a direction parallel to the elements of the cylindrical surface, and end members carried by said semi-cylindrical members at the corresponding ends of each of said semi-cylindrical members for forming a support for the filter element when enclosed within said cage whereby said cage forms a substantially hollow cylindrical enclosing element for holding the filter in compact relation with the filter supported by the lower closed end thereof.

13. In a filter, the combination with a filter element arranged in compact relation and a cage for holding said filter element in compact relation and for supporting the same comprising a pair of reticulated semi-cylindrical members pivoted to each other in a direction parallel to the elements of the cylindrical surface, and end members carried by said semi-cylindrical members at the corresponding ends of each of said semi-cylindrical members for forming a support for the filter element when enclosed within said cage whereby said cage forms a substantially hollow cylindrical enclosing element for holding the filter in compact relation with the filter supported by the lower closed end thereof, said end members being formed with perforations to permit the passage of the fluid to be filtered therethrough.

14. In a filter, the combination with a filter element adapted to be arranged in compact form, and a cage for enclosing said filter element when in said compact form comprising a pair of cylindrically formed members of reticulated material reinforced at the edges thereof by substantially rigid metallic strips, a pivotal connection between said cylindrical portions and between supporting sections contiguous respectively with each of said cylindrical reticulated elements and carried thereby comprising substantially flat metallic members having enlarged openings formed therein not sufficiently great to materially weaken the bottom section, and reticulated elements over said openings.

WILLIAM W. NUGENT.